United States Patent [19]

McDonald et al.

[11] 4,017,779
[45] Apr. 12, 1977

[54] BATTERY ISOLATOR

[75] Inventors: James Anthony McDonald, Buffalo Grove; Ralph Arthur Schatz, Chicago, both of Ill.

[73] Assignee: Motorola, Inc., Schaumburg, Ill.

[22] Filed: Mar. 22, 1976

[21] Appl. No.: 668,756

[52] U.S. Cl. .................................. 320/15; 320/13; 320/40; 323/15; 307/48; 307/86

[51] Int. Cl.² ...................... H02J 7/00; H02J 3/32

[58] Field of Search ............... 323/15; 320/6, 7, 15, 320/13, 40; 307/44, 48, 66, 86

[56] References Cited

UNITED STATES PATENTS

| 2,309,054 | 1/1943 | Fell | 320/15 |
|---|---|---|---|
| 3,445,746 | 5/1969 | Delatorre | 320/40 |
| 3,487,229 | 12/1969 | Krausz | 320/7 X |
| 3,620,220 | 11/1971 | Murphy, Jr. | 307/66 X |

Primary Examiner—Robert J. Hickey
Attorney, Agent, or Firm—James W. Gillman; Eugene Parson; Victor Myer

[57] ABSTRACT

First and second batteries each connected in parallel with a load and a battery isolator connected between the first battery and the second battery and the load including a series pass transistor connected in series with the first battery and the load and circuitry for comparing the voltage across the load to the voltage across the first battery and turning off the series pass transistor when the voltage of the first battery drops below the voltage at the load plus a predetermined offset voltage, which offset voltage is developed by the battery isolator. The battery isolator operates like a diode isolation circuit having a near perfect diode therein.

10 Claims, 3 Drawing Figures

BATTERY ISOLATOR

BACKGROUND OF THE INVENTION

In electrical systems using plurality of batteries in parallel to extend operating life, premature battery failure can occur if one of the cells fails. When a battery fails or becomes extremely weak it frequently appears as a low resistance to the remaining batteries. Thus, the failure of one battery in a group of batteries can prematurely drain all of the batteries or cells.

The reliability of the multicell battery packages can be greatly enhanced by providing an isolation device between the cells to isolate the individual cells so that the premature failure of one cell does not affect the remaining cells. Groups of diodes have been used as isolation devices for this purpose. In systems utilizing two volts or less, diode isolation is not practical because silicon diodes have too large a voltage drop, thus, severely reducing the voltage available for the equipment attached to the battery. Germanium diodes have a lower voltage drop, which could make them marginally useful except for the fact that the high reverse leakage of these devices renders them relatively useless for isolation purposes.

SUMMARY OF THE INVENTION

The present invention pertains to a battery isolator adapted to connect the terminals of a first battery or cell to a load and isolate the first battery or cell from a second battery or cell connected to the load in parallel with the first battery or cell, said isolator including a series pass transistor connected in series with the first battery and the load, and means for comparing the voltage across the load with the voltage across the first battery and stopping conduction of the series pass transistor when the voltage across the battery is less than the voltage across the load plus a predetermined offset voltage.

It is an object of the present invention to provide a new and improved battery isolator for pluralities of low voltage batteries or cells connected in parallel.

It is a further object of the present invention to provide new and improved battery isolators which are simple and inexpensive to manufacture and which are capable of isolating single cells without excessive leakage currents or voltage drops in the isolators.

It is a further object of the present invention to provide a new and improved battery isolator which can be easily incorporated into an integrated circuit.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
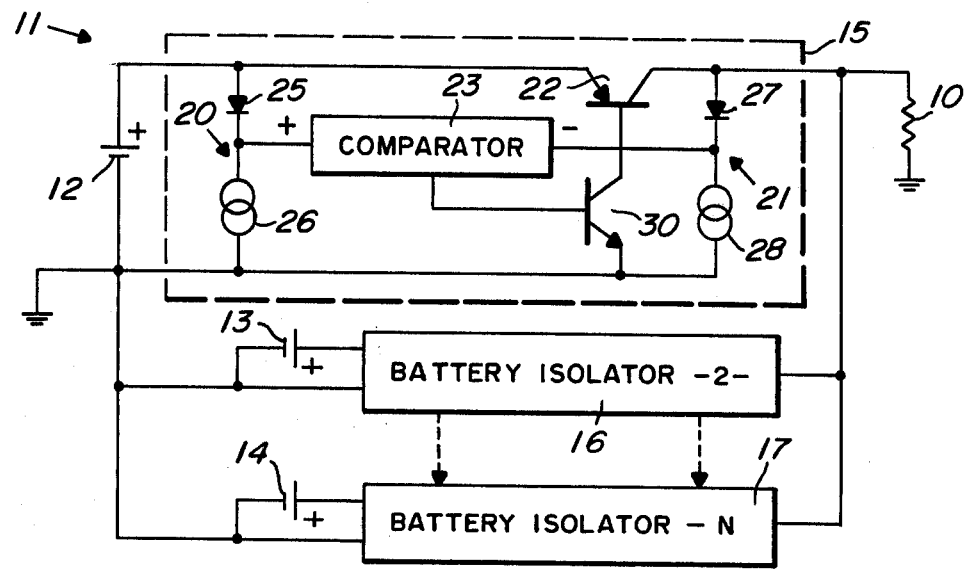
FIG. 1 is a schematic diagram of a simplified battery isolator embodying the present invention.

Referring specifically to FIG. 1, a load designated 10 is illustrated having a power supply generally designated 11 and including a first battery 12, a second battery 13 and a third battery 14 connected thereto. It should be understood that the term "battery" utilized in this specification includes any battery having one or more cells as well as each of the cells in a multicell unit. For example, the batteries 12, 13 and 14 might very well be three cells in a single unit or they might be three separate one cell batteries. Each of the batteries 12, 13 and 14 is essentially connected in parallel with the load 10 by battery isolators 15, 16 and 17, respectively. Since each of the battery isolators 15, 16 and 17 are identical, only the battery isolator 15 is illustrated in detail.

The battery isolator 15 includes a first voltage divider, generally designated 20, a second voltage divider, generally designated 21, a semiconductor device, which in this embodiment is a series pass P-N-P type transistor 22 and a comparator 23. The emitter of the transistor 22 is connected to the positive terminal of the battery 12 and the collector is connected to one side of the load 10. The negative terminal of the battery 12 is grounded and the opposite side of the load 10 is grounded so that the transistor 22 is connected is series with the battery 12 and the load 10. The first voltage divider 20 includes a diode 25 having an anode connected to the positive terminal of the battery 12 and a cathode connected to one side of a current source 26, the other side of which is connected to ground or the negative terminal of the battery 12. The second voltage divider 21 includes a diode 27, the anode of which is connected to the collector of the transistor 22 and the cathode of which is connected to one side of a current source 28, the other side of which is grounded. It should be understood that the current sources 26 and 28 may be any convenient current source, such as simply resistors connected in series with the diodes 25 and 27 or they may be more complicated circuitry as will be described in conjunction with FIG. 2. The junction of the cathodes of diodes 25 and 27 with the current sources 26 and 28 form output terminals for the first and second voltage dividers, respectively, which terminals are connected to two separate inputs of the comparator 23. The comparator 23 also has an output which is connected to the base of a N-P-N type transistor 30. The emitter of the transistor 30 is connected directly to ground and the collector is connected directly to the base of the transistor 22.

In the operation of the isolator 15, the comparator 23 compares the voltage at the output terminal of the first voltage divider 20 to the voltage at the output terminal of the second voltage divider 21 and supplies a signal to the base of the transistor 30 causing conduction thereof as long as the voltage of the battery 12 is approximately equal to the voltage across the load 10 supplied by the remaining batteries 13 and 14 plus a predetermined offset voltage across the transistor 22 dependent upon the amount of drive current supplied to the base thereof. When the voltage of the battery 12 becomes too low, compared to the voltage across the load 10, the comparator 23 cuts off transistor 30, which prevents conduction of transistor 22 and effectively isolates battery 12 from the load 10 and the remaining batteries 13 and 14. It should be understood that the comparator 23 may be a well known comparator, such as those including differential amplifiers and the like, or it may be circuitry which is sensitive to voltages at predetermined points in the first and second voltage dividers and which controls the conduction of the series pass transistor 22 in accordance therewith. A circuit of the second type will be described presently in conjunction with FIGS. 2 and 3.

Referring more specifically to the isolator 15 in FIG. 1, the current sources 26 and 28 supply current in a predetermined ratio to the diodes 25 and 27, in this embodiment the currents are equal. Further, the diodes 25 and 27 have a specified area ratio, in this embodiment the area of diode 27 is twice the area of the diode 25, therefore, the difference between the voltage drop across the diode 25 and the diode 27 will be about 18 millivolts. It should be noted that this differential voltage is nearly temperature independent. When the voltage drop across the series pass transistor 22 is equal to the above mentioned differential diode voltage, 18 millivolts in this embodiment, the differential input to the comparator will be approximately zero. If all of the batteries 12, 13 and 14 are substantially indentical, all of the batteries will supply equal current to the load 10. As the voltage of the battery 12 sags, the batteries 13 and 14 will maintain the voltage at the load 10 constant. As this occurs, the apparent saturation voltage of the transistor 22 will be less than the predetermined voltage, e.g. 18 millivolts. The action of the comparator 23 will then be to reduce the base drive to the transistor 30 and, therefore, the base drive to the series pass transistor 22 in order to increase its saturation voltage. However, as the voltage of the battery 12 sags, the apparent saturation voltage of the series pass transistor 22 is primarily dependent on the voltage of cells 13 and 14 and not on the base drive thereto. Therefore, the comparator 23 will cause the base drive to the series pass transistor 22 to be lowered until either the predetermined saturation voltage (18 millivolts) is reached or the base drive is reduced to zero. If the source impedance of the battery 12 is low and the loop gain of the comparator circuit 23 is high, just a few millivolts of sag in the battery 12 will cause the isolator circuit to reduce the base drive of the series pass transistor 22 to zero, thus, isolating the battery 12 from the load 10. As the voltage of the battery 12 continues to sag, even to zero volts, the series pass transistor 22 will remain cut off and thereby prevent the remaining batteries from being discharged into the dead battery 12.

Figure 2:
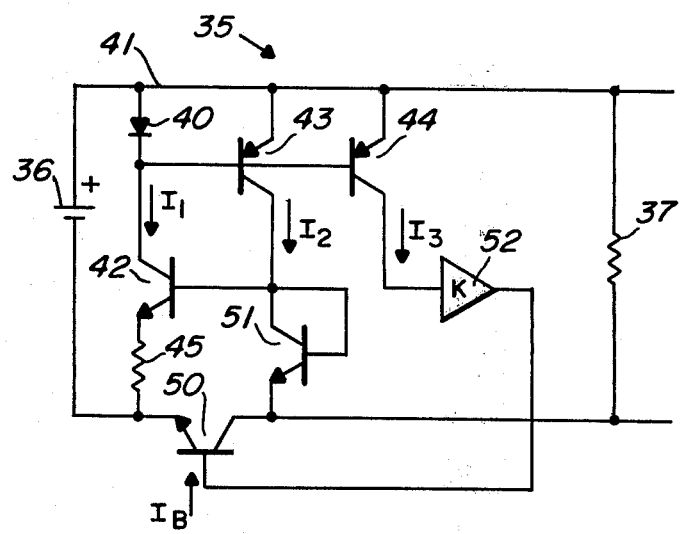
FIG. 2 is a schematic diagram of another battery isolator embodying the present invention.

Referring specifically to FIG. 2, an embodiment of a battery isolator, generally designated 35, is illustrated which includes a comparator and current sources in more detail. The isolator 35 is connected between a battery 36 and a load 37 and additional batteries and isolators are not illustrated since they would all be identical. In the isolator 35, the anode of a diode 40 is connected to a reference point or bus 41, which is connected to the positive side of the battery 36, and the cathode of the diode 40 is connected to the collector of an N-P-N type transistor 42 and the bases of a pair of P-N-P type transistors 43 and 44. The emitter of the transistor 42 is connected through a resistor 45 to the negative side of the battery 36 and to one terminal of a semiconductor device, which in this embodiment is the emitter of a N-P-N type series pass transistor 50. The base of the transistor 42 is connected to the collector of the transistor 43 and to the collector of a N-P-N type transistor 51. The base of the transister 51 is connected to the collector thereof so that it operates as a diode and the emitter is connected to the collector of the transistor 50. The emitters of the transistors 43 and 44 are connected directly to the bus 41. The collector of the transistor 44 is connected through a current amplifier 52 to the base of the transistor 50 and the load 37 is connected between the bus 41 and the collector of the transistor 50. In the present embodiment the current amplifier 52 has a current gain of $k$, the resistor 45 has a value of 1.8 k ohms and the emitter area of the transistor 51 is twice the emitter area of the transistor 42. It will of course be understood that these values are set forth for purposes of the description of operation of this circuit and many variations may be devised by those skilled in the art. Further, the circuitry disclosed in FIGS. 2 and 3 has been devised for ease of incorporation into an integrated circuit but other variations may be devised for use in integrated circuits or with discrete components if desired.

In the operation of the circuit illustrated in FIG. 2, collector current of the transistor 42 is labeled $I_1$, collector current of the transistor 43 is labeled $I_2$, and collector current of the transistor 44 is labeled $I_3$. The diode 40 operates to bias the transistors 43 and 44 so that the currents $I_1$, $I_2$ and $I_3$ are all substantially equal, assuming that the beta of the transistors 43 and 44 is sufficiently high. Since the currents $I_1$ and $I_2$ are equal and the emitter area of the transistor 51 is twice the emitter area of the transistor 42, the base-to-emitter voltage of the transistor 42 ($V_{BE42}$) equals the base-to-emitter voltage of the transistor 51 ($V_{BE51}$) plus 18 millivolts. Therefore, by simple circuit analysis where $V_{sat}$ equals the saturation voltage across transistor 50 and assuming the beta of transistor 42 is high, the following equation applies.

$$I_1 \times 1.8K\Omega + V_{BE42} = V_{sat} + V_{BE51}$$

Rearranging the above equation results in the following equation.

$$I_1 = \frac{V_{sat} - 18mV}{1.8K\Omega}$$

Since the base current of transistor 50 is a result of amplifying the current $I_3$, which is equal to $I_1$, the following equation can be written.

$$I_3 = I_1 = I_B/K$$

By substituting the previous equation for $I_1$ and solving for $I_B$, where $I_B$ is the base current to the transistor 50, the following equation evolves.

$$I_B = \frac{K(V_{sat} - 18mV)}{1.8K\Omega}$$

It can be seen from the latter equation above the as $V_{sat}$ (saturation voltage of the transistor 50) increases beyond 18 millivolts, the bias current for transistor 50 rises sharply, which will cause the $V_{sat}$ to be reduced. This result demonstrates the regulation effect of the circuit illustrated in FIG. 2. Thus, saturation of the pass transistor 50 is achieved with a minimum of base drive so that efficiency is maximized. The isolation effect of this circuit can be seen by considering the latter equation above when $V_{sat}$ is less than 18 millivolts. Since the base current of the transistor 50 would reverse or be negative when $V_{sat}$ is less than 18 millivolts, which cannot occur, transistor 50 becomes cut off and isolates the battery 36 from the load 37.

Figure 3:
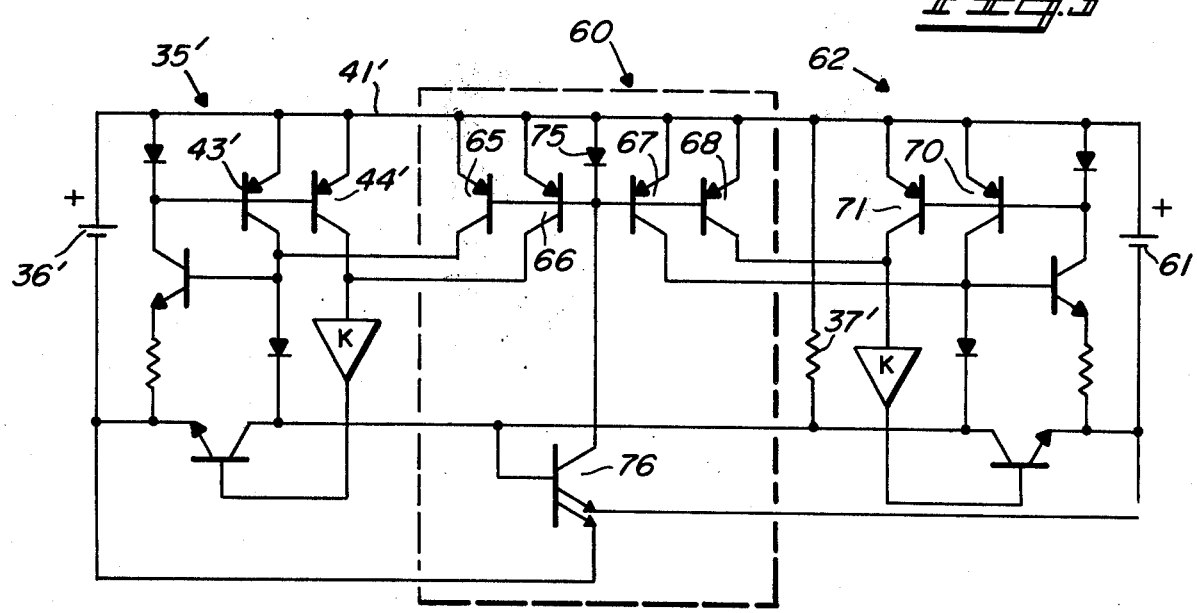
FIG. 3 is a schematic diagram further illustrating the battery isolator of FIG. 2.

The circuit of FIG. 2 is not self-starting because the various active devices in the circuit will remain in their initial cut off state when battery voltage is applied thereto and the circuit will not function. Therefore, in the schematic diagram of FIG. 3 a starting circuit, generally designated 60, is added thereto. In the circuit of FIG. 3 a first battery 36' is connected through an isolator 35' to a load 37'. This circuit is identical with the circuit described in conjunction with FIG. 2 and, therefore, similar numbers have been used to designate the similar parts and primes have been added to indicate a further embodiment. A second battery 61 is connected to the load 37' by a second isolator 62, identical with the isolator 35'. In the starting circuit 60, the emitters of four P-N-P type transistors 65–68 are connected to the reference point or bus 41' and the bases are all connected together. The collector of the transistor 65 is connected to the collector of the transistor 43' in the isolator 35'. The collector of the transistor 66 is connected to the collector of the transistor 44' in the isolator 35'. The collector of the transistor 67 is connected to the collector of a P-N-P type transistor 70 in the isolator 62, functioning the same as the transistor 43' in the isolator 35'. The collector of the transistor 68 is connected to the collector of a P-N-P type transistor 71 in the isolator 62, functioning the same as the transistor 44' in the isolator 35'. The anode of a diode 75 is connected to the reference bus 41' and the cathode is connected to the collector of a multi-emitter N-P-N type transistor 76. One emitter of the transistor 76 is connected to the negative terminal of the battery 36' and a second emitter of the transistor 76 is connected to the negative terminal of the battery 61. The base of the transistor 76 is connected to the load 37' on the side opposite the reference bus 41'. It should be understood that the circuit can be expanded to isolate any number of cells.

In the operation of the starting circuit 60, when either or both of the batteries 36' and 61 are supplying the required voltage the transistor 76 conducts drawing current through the diode 75 and biasing all of the transistors 65–68 into conduction. Thus, the four transistors 65–68 supply starting current to the two isolator circuits 35' and 62 so that these isolator circuits may begin functioning. Once the isolator circuit 35' and/or 62 begin to operate normally the transistor 76 is turned off so that the transistors 65–68 turn off and the starting circuit 60 no longer influences circuit operation. Since the starting circuit 60 can easily be incorporated into the integrated circuit with the battery isolators 35' and 62, the entire circuit is relatively simple and inexpensive to manufacture.

Thus, an improved battery isolator circuit is disclosed which can effectively isolate low voltage batteries including single cells and generally 4.5 volts and below. This circuit provides excellent isolation of dead battery cells from good cells with very low forward voltage drop and excellent overall power efficiency under a wide range of operating conditions. Further, the isolator can be incorporated into integrated circuits so that it is small enough to include in a battery if desired and is relatively inexpensive to manufacture. The battery isolator is especially useful in low voltage power supplies where reliability is important and parallel power sources are used to extend operating life. Examples of such uses are pagers or electronic watches and any equipment using rechargeable batteries or solar cell devices.

We claim:

1. A battery isolator adapted to connect the terminals of a battery to a load and isolate the battery from other power sources connected to the load in parallel with the battery and providing a voltage across the load, said isolator comprising:
   a. a semiconductor device having first, second and control electrodes with the first and second electrodes adapted to be connected in series with the battery and the load, and providing an offset voltage between the first and second electrodes dependent upon the amount of drive current supplied to the control electrode;
   b. electronic circuit means connected to the control electrode of said semiconductor device and adapted to be coupled to the load and the terminals of the battery for sensing the amplitude of the voltage across the load and the amplitude of the voltage across the battery and for supplying drive current to said semiconductor device to tend to maintain said semiconductor device operating with a predetermined offset voltage thereacross as long as the battery supplies a voltage above the voltage across the load plus the predetermined offset voltage and for causing said semiconductor device to cease conducting when the voltage of the battery drops below the voltage across the load plus the predetermined offset voltage.

2. A battery isolator adapted to connect the terminals of a battery to a load and isolate the battery from a power source connected to the load in parallel with the battery, said isolator comprising:
   a. a semiconductor device having first, second and control electrodes with the first and second electrodes adapted to be connected in series with the battery and the load;
   b. first voltage divider means adapted to be connected in parallel with the battery and having an output terminal;
   c. second voltage divider means adapted to be connected in parallel with the load and having an output terminal;
   d. comparator means having two input terminals, one each connected to the output terminals of said first and second voltage dividers, and an output terminal; and
   e. means coupling the output terminal of said comparator means to the control electrode of said semiconductor device for supplying drive current to said semiconductor device to tend to maintain said semiconductor device operating in saturation as long as the battery supplies a voltage above a voltage across the load supplied by the power source plus a predetermined offset voltage and for causing said semiconductor device to cease conduction when the voltage of the battery drops below the voltage across the load plus the predetermined offset voltage.

3. A battery isolator as claimed in claim 2 wherein the semiconductor device is a transistor.

4. A battery isolator as claimed in claim 2 wherein the first and second voltage dividers each include a semiconductor diode having areas in a predetermined ratio relative to each other.

5. A battery isolator as claimed in claim 4 wherein the first and second voltage dividers each include current sources for supplying current to the diodes in a predetermined ratio relative to each other.

6. A battery isolator as claimed in claim 5 wherein the current sources are substantially equal and the area of the diode in the second voltage divider is approximately twice as large as the area of the diode in the first voltage divider.

7. A battery isolator adapted to connect the terminals of a first battery to a load and isolate the first battery from a second battery connected to the load in parallel with the first battery, said isolator comprising:
   a. a semiconductor device having first, second and control electrodes with the first and second electrodes adapted to be connected in series with the first battery and the load;
   b. first voltage divider means adapted to be connected in parallel with the first battery;
   c. second voltage divider means adapted to be connected in parallel with the load;
   d. comparator means connected to the control electrode of said semiconductor device and sensitive to voltage appearing across the first and second electrodes of said semiconductor device, voltage appearing across a portion of said first voltage divider and voltage appearing across a portion of said second voltage divider for supplying drive current to said semiconductor device to tend to maintain said semiconductor device operating in saturation as long as the first battery supplies a voltage above a voltage across the load supplied by the second battery plus a predetermined offset voltage and for causing said semiconductor device to cease conducting when the voltage of the first battery drops below the voltage across the load plus the predetermined offset voltage.

8. A battery isolator adapted to connect the terminals of a first battery to a load and isolate the first battery from a second battery connected to the load in parallel with the first battery, said isolator comprising:
   a. a series pass semiconductor device having first, second and control electrodes with the first and second electrodes adapted to be connected in series with the first battery and the load;
   b. first voltage divider means adapted to be connected in parallel with the first battery and includes resistance means, a diode and a semiconductor device having first, second and control electrodes with the first electrode being coupled through the resistance means to the first electrode of said series pass semiconductor device which is adapted to be connected to one side of the first battery and the second electrode being coupled through the diode to a reference point adapted to be connected to the other side of the first battery;
   c. second voltage divider means adapted to be connected in parallel with the load and including a diode and a semiconductor device having first, second and control electrodes with the first electrode being coupled to the reference point and the second electrode being coupled through the diode to the second electrode of said series pass semiconductor device;
   d. the control electrode of the semiconductor device in said first voltage divider means being coupled through the diode in said second voltage divider means to the second electrode of said series pass semiconductor device;
   e. current amplifier means having an output connected to the control electrode of said series pass semiconductor means and an input; and
   f. a semiconductor device having first, second and control electrodes with the first electrode coupled to the reference point, the second electrode coupled to the input of said current amplifier means and the control electrode coupled to the control electrode of the semiconductor device in said second voltage divider means and through the diode in said first voltage divider means to the reference point.

9. A battery isolator as claimed in claim 8 including in addition starting circuitry connected to at least one of the series pass semiconductor devices, the first voltage divider means and the second voltage divider means for providing a starting current thereto when at least one of the first and second batteries is supplying a suitable output voltage.

10. A method of isolating a battery from a load and other batteries each connected in parallel therein and supplying a voltage to the load, comprising the steps of:
   a. connecting a series pass transistor in series with the battery to be isolated and the load;
   b. comprising the voltage of the battery to be isolated with the voltage across the load plus a predetermined offset voltage across the series pass transistor; and
   c. stopping conduction of the series pass transistor when the voltage of the battery is less than the voltage across the load plus the predetermined offset voltage.

* * * * *